Patented May 31, 1932

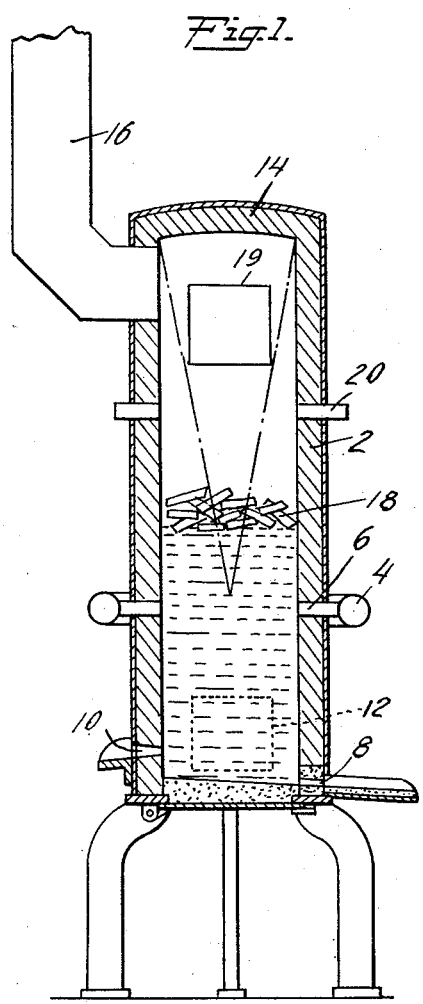

1,861,214

UNITED STATES PATENT OFFICE

MARSTON L. HAMLIN, OF LYNBROOK, NEW YORK, ASSIGNOR TO THE BARRETT COMPANY, OF NEW YORK, N. Y., A CORPORATION OF NEW JERSEY

CUPOLA FURNACE AND METHOD OF OPERATING SAME

Application filed July 18, 1930. Serial No. 468,828.

This invention relates to furnaces such as cupola furnaces which are used for the melting and refining of metal. The invention particularly relates to a new construction and method of operating cupola furnaces to increase the thermal efficiency thereof.

The ordinary cupola furnace is constructed with a chamber, known as the stack, having substantially vertical walls which converge at the upper end of the furnace to form a centrally located flue for the gases produced by combustion of fuel in the furnace. The charge of fuel and metal is ordinarily introduced into the furnace through a charging door in the lateral wall of the stack and occupies only the lower portion of the stack. The fuel is burned by blowing air through the charge of fuel and metal and the combustion gases pass upwardly through the stack and out through the flue. Combustion of the fuel is effected in intimate contact with or in close proximity to the metal charge. The combustion gases contain relatively large amounts of carbon monoxide which is produced by the reversible reaction of incandescent carbon on carobn dioxide resulting from the combustion of the fuel. Substantial amounts of fuel heat are thus lost to the reaction so that the reaction is relatively inefficient. The efficiency of the furnace is also limited by reason of the fact that comparatively little of the radiant heat from the walls of the chamber and from the particles of dust and fuel in the gases above the charge is received by or radiated back to the charge in the lower portion of the chamber.

Among the objects of my invention are to increase the thermal efficiency of cupola furnaces, to reduce the carbon monoxide content of the gases leaving the furnace and to utilize the radiant heat produced in the furnace to assist in the melting of the metal in the charge.

Particular objects of my invention are to provide a new furnace construction and a new method of operating cupola furnaces which are more efficient than those ordinarily employed.

In accordance with my invention, I construct a cupola furnace with an off-set flue for the gases leaving the furnace and a roof which may be arched with its focus or center of curvature within the furnace so as to reflect back onto the charge of metal in the lower portion of the furnace, heat radiated upwardly from the charge and walls of the furnace and from incandescent particles in the gases in the furnace and heat produced by the combustion of fuel and gases within the furnace. In the preferred form of my invention, supplemental tuyères or air inlets are formed in the walls of the furnace above the charge of metal and incandescent fuel being treated, through which supplemental air is introduced to complete the combustion of carbon monoxide produced by the burning of fuel in the charge. The heat thus produced is transmitted to the walls and roof of the furnace, in part by conduction and in part by radiation, as from the incandescent particles of fuel and dust in the gases above the charge. The radiant heat thus produced is reflected downwardly from the curved roof of the furnace onto the charge in the lower portion of the chamber.

My invention is particularly applicable in so-called "hot top" operation of cupola furnaces—a method of operation frequently practiced in the cupola melting of non-ferrous metals. In "hot top" operation the fuel bed is kept sufficiently low to permit the entire bed and metal charge to reach incandescence. Charging is frequent, e. g., in the usual type of cupola, every fifteen minutes, and metal and fuel increments small, e. g., 30 pounds of coke and 500 pounds of bronze in a furnace of twenty-two inches diameter.

In melting non-ferrous metals in this way it is particularly advantageous to use a solid fuel of low ash and sulfur content and of great mechanical strength, such as pitch coke, and to burn the fuel under carefully regulated conditions of draft. A high ratio of metal melted to fuel consumed is thus realized, as compared with other customary methods of non-ferrous metal melting. By the practice of the present invention, economies are introduced tending to result in a still more favorable metal: fuel ratio. This is of especial importance when a relatively high grade and costly fuel such as pitch coke is used. This ratio may, for example, exceed 17 parts by weight of bronze melted per 1 part by weight of pitch coke consumed.

My invention will be more clearly understood by reference to the accompanying figures of the drawings which illustrate a preferred type of cupola construction embodying my invention. In the drawings, Fig. 1 is a diagrammatic sectional view through one type of furnace embodying my invention, and Fig. 2 is a similar view of a modified form of my invention.

In the forms of the invention illustrated in the drawings, the furnace is formed with a stack having substantially vertical walls 2 lined with fire-brick or other suitable refractory material. The lower portion of the stack is provided with the usual bustle pipe 4 and air tuyères 6 as well as an outlet 8 for the molten metal and an outlet 10 for the slag produced by the melting of the metal. A clean-out door 12 is also provided in the lower portion of the stack.

The upper portion of the furnace is provided with a curved roof 14 lined with refractory material, substantially concentric with the vertical walls of the stack, and preferably paraboloidal in cross section. A flue 16 for the removal of products of combustion leaving the furnace is located in the lateral wall of the stack adjacent the roof of the furnace. A charge 18 of fuel and metal to be treated is located in the lower portion of the furnace, being introduced through the charging door 19.

Supplemental tuyères 20 are located in the walls of the stack above the charge 18 in the lower portion of the furnace. Air to be used in the combustion of the gases in the upper portion of the furnace is introduced by the supplemental tuyères 20.

The method of operating the furnace is as follows: The charge of fuel and metal is introduced into the furnace and the fuel is burned by blowing air or other combustion supporting gas through the tuyères 6 into contact with the fuel in the charge 18. The fuel and metal thus become incandescent, the metal melts, and the products of combustion pass upwardly through the furnace into the upper portion of the stack. The molten metal is tapped periodically from the bottom of the furnace through the tap hole 8, and slag is removed through slag hole 10. The combustion gases contain substantial amounts of carbon monoxide which is completely burned to carbon dioxide by the supplemental air introduced through the tuyères 20, above the charge 18 in the lower portion of the furnace. The heat thus produced is transmitted by conduction and radiation to the walls and the curved roof 14 of the furnace by passage of the burning gases upwardly in contact therewith to the flue 16. The refractory roof of the furnace thus becomes highly incandescent and reflects and radiates heat back onto the charge of fuel and metal in the lower portion of the furnace. In this way the charge is heated to a higher temperature than would be possible with the combustion of an equal amount of fuel in an ordinary type of cupola furnace such as described above, or less fuel is required to heat the charge to the same temperature as is obtained in the usual cupola. Furthermore, the carbon monoxide in the gases leaving the furnace is burned to carbon dioxide and the heat thus liberated is utilized in heating the roof of the furnace and increasing the radiation of heat back onto the charge of metal in the lower portion of the furnace. It is therefore evident that the thermal efficiency of my new type of cupola furnace is substantially greater than that of the ordinary cupola furnace now in general use.

The form of my invention illustrated in Fig. 2 differs from that illustrated in Fig. 1 in that the upper portion 22 of the furnace above the charge is enlarged to form a combustion space 24 in which the carbon monoxide produced by the combustion of the fuel in the charge is burned to carbon dioxide. The velocity of the gases is thereby reduced and opportunity for more complete combustion is afforded. The operation of the form of the invention illustrated in Fig. 2 is substantially the same as that illustrated in Fig. 1.

My invention is not limited in its application to cupola furnaces burning solid fuel or exclusively solid fuel. It may, for example, be practiced in conjunction with the use of coke and oil, coke and powdered coal or coke and gas as fuel. It may be practiced when no solid fuel is used and the heat is supplied entirely by the combustion of gaseous fuel or atomized or vaporized liquid fuel, the metal, for example, being supported until melted on a broken mass of refractory material, through the interstices of which the molten metal may flow downward and the fuel and products of combustion may flow upward.

Although I have illustrated and described preferred types of cupola furnace construction embodying my invention, it is not intended that the invention should be limited to the constructions and arrangements set forth above nor is it intended that the process should be limited to its use in cupola furnace constructions of the type set forth above, except as defined by the claims.

I claim:

1. A furnace for the melting and refining of metals comprising a chamber adapted to receive a charge of metal and fuel, means for passing air through the charge to burn the fuel, means for introducing a supplemental supply of air into the chamber above the charge to burn combustible constituents of the gas above said charge, and a roof for the furnace positioned to be heated by the gases above the charge and to radiate heat onto the charge.

2. A furnace for the melting and refining of metals comprising a chamber adapted to receive a charge of metal and fuel, means for passing air through the charge to burn the fuel, means for introducing a supplemental supply of air into the chamber above the charge to burn combustible constituents of the gas above said charge, a curved roof for the furnace positioned to radiate heat onto the charge, and an outlet for the products of combustion from said chamber located in the lateral walls of the furnace adjacent said roof.

3. A furnace for the melting and refining of metals comprising a chamber adapted to receive a charge of fuel and metal, said chamber being formed with an enlarged space above the charge, and a roof for the chamber positioned to be heated by the products of combustion of the fuel in said space and to radiate heat onto the charge in the chamber.

4. A cupola furnace for the melting and refining of metals comprising a chamber having a portion adapted to receive a charge of fuel and metal in the lower portion thereof, means for passing air through the charge to burn the fuel, there being an enlarged portion above the charge-receiving portion formed by the lateral walls of the furnace, means for introducing supplemental air into the enlarged portion of the furnace above the charge to burn combustible constituents of the gas produced by combustion of the fuel, a curved roof for said furnace positioned substantially concentric with the walls of the chamber and having its center of curvature within the furnace to radiate heat onto the charge, and an outlet for the gases located in the lateral wall of the chamber adjacent said roof.

5. A cupola furnace for the melting and refining of metals comprising a chamber adapted to receive a charge of fuel and metal, means for introducing supplemental air into the chamber above the charge of fuel and metal to burn carbon monoxide in the gases above the charge and a curved roof for the chamber positioned to be heated by gases above the charge and to reflect and radiate heat back onto the charge of fuel and metal in the chamber.

6. The method of operating a cupola furnace having a chamber for receiving a charge of fuel and metal in the lower portion thereof, which comprises burning said fuel thereby producing combustible gas, introducing supplemental air into the furnace above the charge and radiating heat produced by the combustion of said gas back onto the charge in said chamber.

7. The process of melting metals which comprises charging metal and fuel onto an incandescent fuel bed in a cupola furnace with a reflecting roof, supplying air to the fuel bed to effect combustion of the fuel, and supplying additional air to the combustion gases above the fuel bed to effect further combustion of combustible gases, thereby heating the roof to incandescence and exposing the furnace contents to heat radiated from the roof.

8. The process of melting non-ferrous metals which comprises charging the non-ferrous metal to be melted and pitch coke onto an incandescent fuel bed in a cupola furnace with a reflecting roof, supplying air to the fuel bed to effect combustion of the pitch coke and supplying supplemental air to the combustion gases above the fuel bed to effect further combustion of combustible gases, thereby heating the roof to incandescence, and exposing the furnace contents to heat radiated from the roof.

9. The process of melting bronze which comprises charging the bronze to be melted and pitch coke onto an incandescent fuel bed in a cupola furnace with a reflecting roof, supplying air to the fuel bed to effect combustion of the pitch coke and supplying supplemental air to the combustion gases above the fuel bed to effect further combustion of combustible gases, thereby heating the roof to incandescence and exposing the furnace contents to heat radiated from the roof.

10. The process of melting bronze which comprises charging the bronze to be melted and pitch coke in proportions of not less than 17 parts by weight of bronze to 1 part by weight of pitch coke onto an incandescent fuel bed in a cupola furnace with a reflecting roof, supplying air to the fuel bed to effect combustion of the pitch coke and supplying supplemental air to the combustion gases above the fuel bed to effect further combustion of combustible gases, thereby heating the roof to incandescence and exposing the furnace contents to heat radiated from the roof.

11. A furnace for melting or refining material comprising a chamber adapted to receive a charge of fuel and material to be treated, means for admitting combustion supporting gas into said chamber to burn said fuel and produce combustible gas, means for introducing supplemental combustion supporting gas into said chamber above said charge to burn said combustible gas and a roof for said furnace positioned to be heated by combustion of gas above said charge, and to radiate heat onto said charge.

12. A method of operating a cupola furnace having a chamber adapted to receive a charge of fuel and material to be treated in the lower portion thereof, which comprises burning said fuel thereby producing combustible gas, introducing combustion supporting gas into said chamber above said charge, burning said combustible gas and radiating heat produced by combustion of said gas onto the charge in the lower portion of said chamber.

13. A method of operating a cupola furnace having a chamber provided with a roof and adapted to receive a charge of fuel and material to be treated in the lower portion thereof which comprises burning said fuel thereby producing combustible gas, introducing combustion supporting gas into said chamber above said charge, burning said combustible gas, passing the same in contact with said roof, and radiating heat produced by combustion of said gas from said roof onto the charge in the lower portion of said chamber.

MARSTON L. HAMLIN.